United States Patent [19]
Akasaka et al.

[11] Patent Number: 5,548,096
[45] Date of Patent: Aug. 20, 1996

[54] METHOD AND APPARATUS FOR ASSEMBLING MOTOR VEHICLE BODY

[75] Inventors: Yoshio Akasaka; Kenichi Kakijima; Takeshi Endoh; Goro Uchida; Masaaki Tanaka; Takefumi Fujie; Daiji Sukawa; Satoshi Endoh; Hideo Saitoh; Takashi Kubo, all of Sayama, Japan

[73] Assignee: Honda Giken Kogyo Kabushiki Kaisha, Tokyo, Japan

[21] Appl. No.: 327,490

[22] Filed: Oct. 21, 1994

[30] Foreign Application Priority Data

Nov. 17, 1993 [JP] Japan .................................. 5-288093
Nov. 17, 1993 [JP] Japan .................................. 5-288094

[51] Int. Cl.⁶ ........................... B23K 11/11; B23K 11/24; B23K 37/00
[52] U.S. Cl. .................... 219/117.1; 219/86.25; 219/86.7; 219/87; 219/91.2; 219/108; 901/42
[58] Field of Search .......................... 219/79, 80, 86.1, 219/86.24, 86.25, 87, 91.2, 108, 117.1; 228/6.1; 901/42

[56] References Cited

U.S. PATENT DOCUMENTS

| | | | |
|---|---|---|---|
| 4,404,451 | 9/1983 | Niikawa et al. | 219/80 |
| 4,593,850 | 6/1986 | Ariga et al. | 228/47 |
| 5,188,276 | 2/1993 | Furuya et al. | 228/6.1 |

FOREIGN PATENT DOCUMENTS 63-63577  3/1988  Japan.
3-13115   2/1991  Japan.

*Primary Examiner*—Teresa J. Walberg
*Assistant Examiner*—J. Pelham
*Attorney, Agent, or Firm*—Armstrong, Westerman, Hattori, McLeland & Naughton

[57] ABSTRACT

A method for assembling a motor vehicle body by fixing relative positional relationship among a plurality of motor vehicle body constituent parts by means of positioning members provided in a welding jig which is disposed on each side of an assembly station and, in this condition, welding together the plurality of motor vehicle body constituent parts at a plurality of tack-welding locations. First welding guns of indirect feeding type are mounted on the welding jig to weld a part of the tack-welding portions. A welding robot having mounted thereon a second welding gun is disposed outside the welding jig. The above-described part of the tack-welding portions are welded by supplying electric power from the second welding gun to the first welding guns by pinching, by the second welding gun, feeder terminals of the first welding guns in a condition in which the above-described part of the tack-welding portions are being pinched by the first welding guns. The remaining of the tack-welding portions are thereafter welded by the second welding gun.

9 Claims, 16 Drawing Sheets

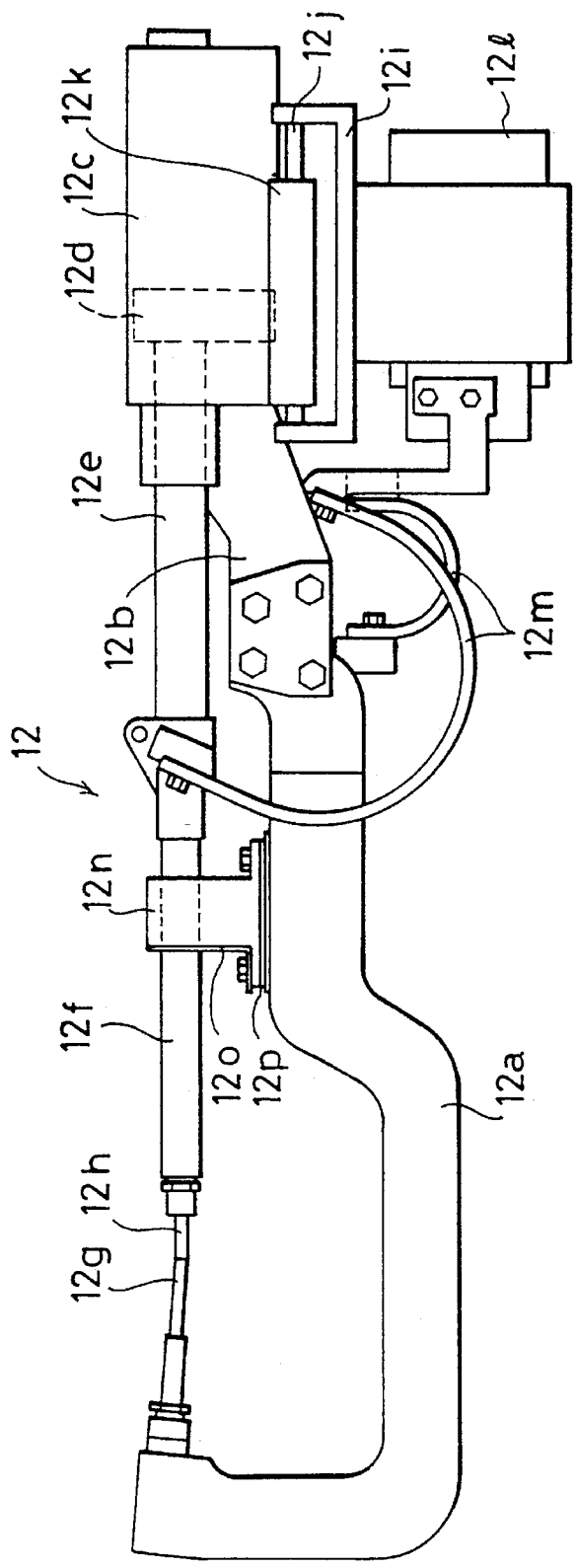
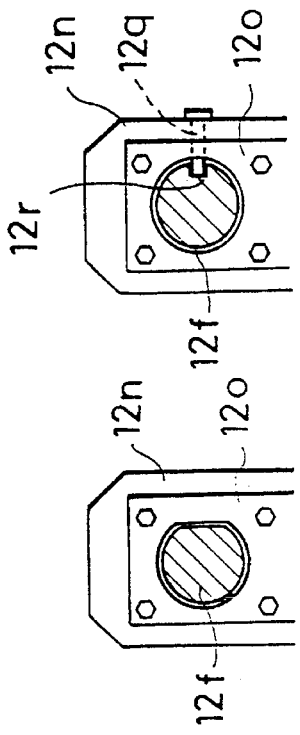
FIG.9
FIG.10A   FIG.10B

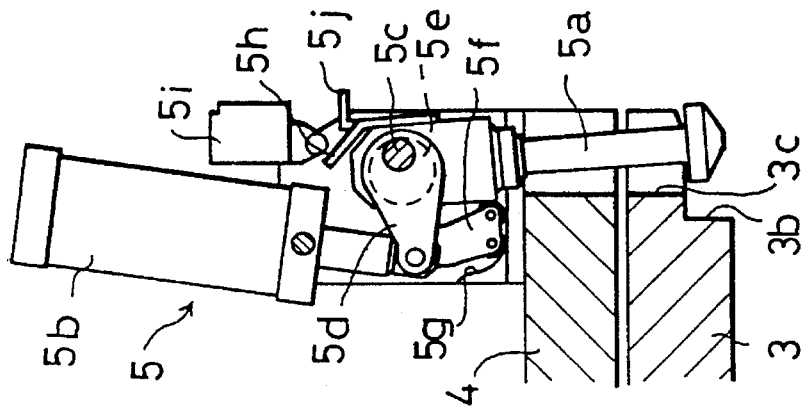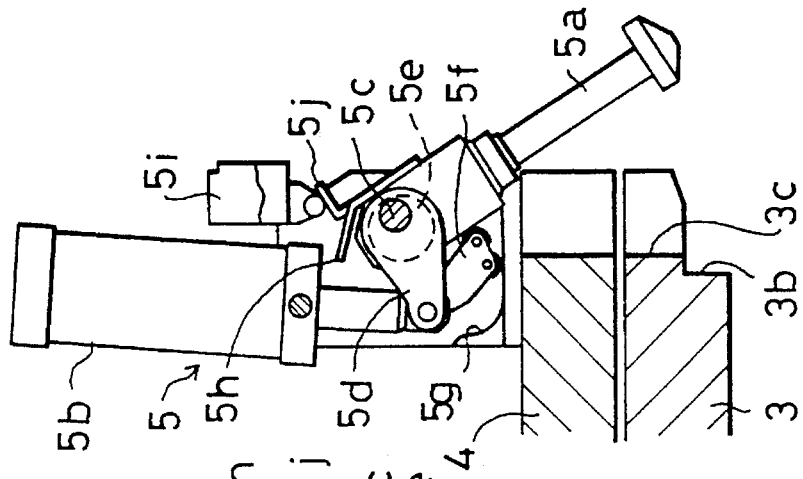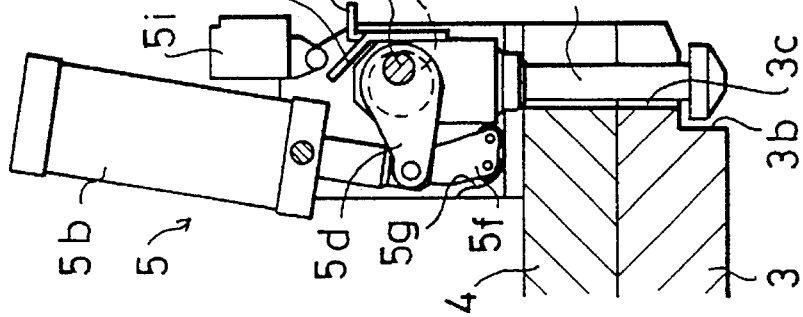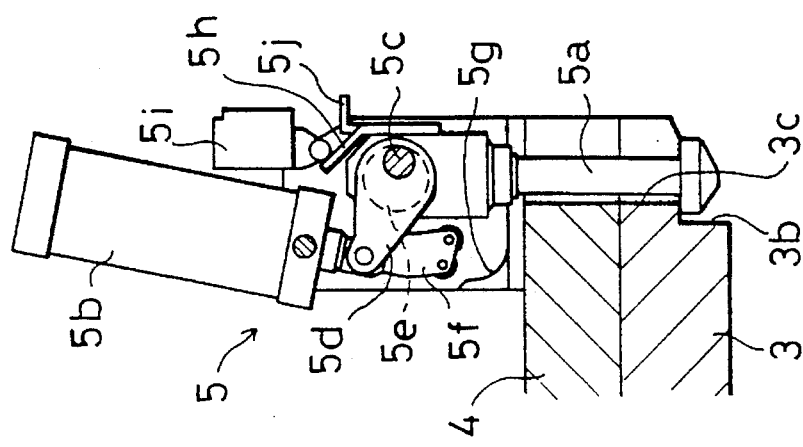

METHOD AND APPARATUS FOR ASSEMBLING MOTOR VEHICLE BODY

BACKGROUND OF THE INVENTION

1. Field of the Invention

The present invention relates to a method of assembling a motor vehicle body by welding together motor vehicle body constituent parts such as a floor panel, right and left side panels, a roof panel or the like at a plurality of tack-welding portions, and also relates to an apparatus to be used in carrying out the above-described method.

2. Description of Related Art

In a motor vehicle body assembly line, welding is carried out first at a plurality of tack-welding portions required to hold a plurality of motor vehicle body constituent parts together in proper orientation, and then reinforcing welding is carried out to secure the strength of the motor vehicle body.

In welding the tack-welding portions, the plurality of motor vehicle body constituent parts are fixed or set in position relative to each other by means of positioning members provided on welding jigs which are disposed on both sides of an assembly station and then, in this condition, welding of the tack-welding portions is carried out by a plurality of welding guns mounted on the welding jigs.

It has hitherto been so arranged that the welding jigs are provided with welding transformers to be connected to welding guns mounted on the welding jigs and that electric power is directly supplied from these welding transformers to the welding guns. However, this arrangement has a disadvantage in that the welding jigs become large in size. As a solution to this disadvantage, the following is known. Namely, the welding guns to be mounted on the welding jigs are arranged by guns of indirect power supply type, and feeder terminals (or electric power supply terminals) which are connected via feeder cables (or electric power supply cables) to the welding guns are fixed to terminal racks which are disposed outside the welding jigs. Each of these feeder terminals is pinched by a portable type welding gun or the like to thereby supply electric power to each of the welding guns mounted on the welding jigs (see Japanese Published Unexamined Utility Model Registration Application No. 10984/1984, Japanese Published Unexamined Patent Application No. 63577/1988 and Japanese Published Examined Patent Application No. 13115/1991).

The welding jigs of a particular design are prepared for each kind of motor vehicle. It follows that they have to be changed for another design when the kind of motor vehicle is changed.

It has hitherto been so arranged that all of the tack-welding portions are welded by the welding guns mounted on the welding jigs. The number of the welding guns to be mounted on the welding jigs therefore becomes large and, as a consequence, the cost of the welding jigs becomes high even if they are formed in the indirect power supply type. It is also necessary to prepare in advance a plurality of welding jigs in preparation for the change in the kind of the motor vehicle, resulting in an extremely high cost.

In this case, the following arrangement may be considered. Namely, only the positioning members are mounted on the welding jigs, and the welding of the tack-welding portions are made by welding robots. In this solution, however, the plurality of tack-welding portions are sequentially pinched together to perform welding. Consequently, there will occur a positional deviation or displacement in those tack-welding portions which lie behind in the welding procedure, due to distortions which may occur when those tack-welding portions which lie ahead in the welding procedure (or in the order of welding) are tack-welded.

In view of the above-described disadvantages, the present invention has an object of assembling a motor vehicle body with a higher accuracy while reducing the equipment cost.

SUMMARY OF THE INVENTION

In order to attain the above-described and other objects, the present invention is directed to assembling a motor vehicle body by fixing relative positional relationship among a plurality of motor vehicle body constituent parts by means of positioning members provided in a welding jig which is disposed on each side of an assembly station and, in this condition, welding together the plurality of motor vehicle body constituent parts at a plurality of tack-welding portions, the improvement comprising: mounting on the welding jig first welding guns of indirect feeding type which are for welding same of the tack-welding portions; disposing a welding robot outside a position in which the welding jig is disposed, the welding robot having mounted thereon a second welding gun; welding the above-described same the tack-welding portions by supplying electric power from the second welding gun to the first welding guns by pinching, by the second welding gun, a feeder terminal of each of the first welding guns, the electric power being supplied in a condition in which the above-described part of the tack-welding portions are being pinched by the first welding guns; and thereafter welding the remaining of the tack-welding portions by the second welding gun.

In carrying out the welding work of the plurality of the tack-welding portions, the welding work is shared by the first welding guns to be mounted on the welding jig and the second welding gun to be mounted on the welding robot. Therefore, the number of the first welding guns becomes small. In conjunction with the effect of eliminating the necessity of mounting welding transformers on the welding jig by supplying electric power from the second welding gun to the first welding guns, the above-described arrangement has an effect of attaining the reduction in physical size and the weight of the welding jig as well as the reduction in the equipment cost.

Further, after the above-described part of the tack-welding portions have been welded by the first welding guns, the remaining tack-welding portions are welded by the second welding gun. Therefore, the positional deviation or displacement of the parts at the time of welding by the second welding gun can be prevented by those tack-welding portions that have already been welded by the first welding guns. The accuracy in the shape of the motor vehicle body can thus be secured.

By the way, as in the above-described conventional example, the following arrangement may be considered. Namely, the feeder terminals for the first welding guns are fixedly provided on the terminal racks that are disposed outside the welding jigs, and the feeder terminals are connected to the first welding guns via feeder cables. In this arrangement, however, it becomes necessary to provide the terminal racks aside from the welding jigs, resulting in a larger apparatus. In addition, at the time of replacement of the welding jigs, it becomes necessary to detach and attach the feeder cables or otherwise to replace the terminal racks together with the welding jigs, resulting in a time-consuming jig replacement work. Still furthermore, there is required a wide operating space for moving the robots having the second welding guns mounted thereon between the side of the terminal racks and the side of the welding jigs, resulting in a poor space efficiency.

In such a case, if an arrangement is made such that the receiving terminals which are in stationary positional relationship with a gun bracket of each of the first welding guns are provided on the respective first welding guns and that an electrically conductive rigid member is fixed at one end thereof to the receiving terminal and at the other end thereof are provided with the feeder terminal, the feeder terminal is supported in a predetermined positional relationship with the gun bracket via the electrically conductive rigid member. Therefore, the terminal racks become needless and the above-described disadvantage can be eliminated. In addition, in order to absorb the positional deviation or displacement of the tack-welding portions in the direction of pinching the workpiece by the first welding guns, it is desired to mount the gun bracket of each of the first welding guns on the welding jig in a manner capable of equalizing operation, i.e., in a manner movable in the direction of pinching the workpiece. If such an arrangement is employed, when the feeder terminal at the end of the electrically conductive rigid member is pinched by the second welding gun, the gun bracket may possibly be forcibly moved via the feeder terminal, with the result that an adverse effect such as deformation may be exerted on the tack-welding portions. In such a case, if the feeder terminal is disposed so as to be pinched in a direction perpendicular to the direction of movement of the feeder terminal due to the equalizing operation of the gun bracket, the gun bracket will not move even if an unbalanced load may be operated on the feeder terminal at the time of pinching them. It is therefore advantageous in that no adverse effect is exerted on the tack-welding portions.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 9 is a front view of one example of a second welding gun;

FIGS. 10A and 10B are side views showing other embodiments of a guide member to be provided in the second welding gun;

FIGS. 11A through 11D are views showing the construction and the operation of a clamp unit;

DETAILED DESCRIPTION OF A PREFERRED EMBODIMENT

Figure 1:
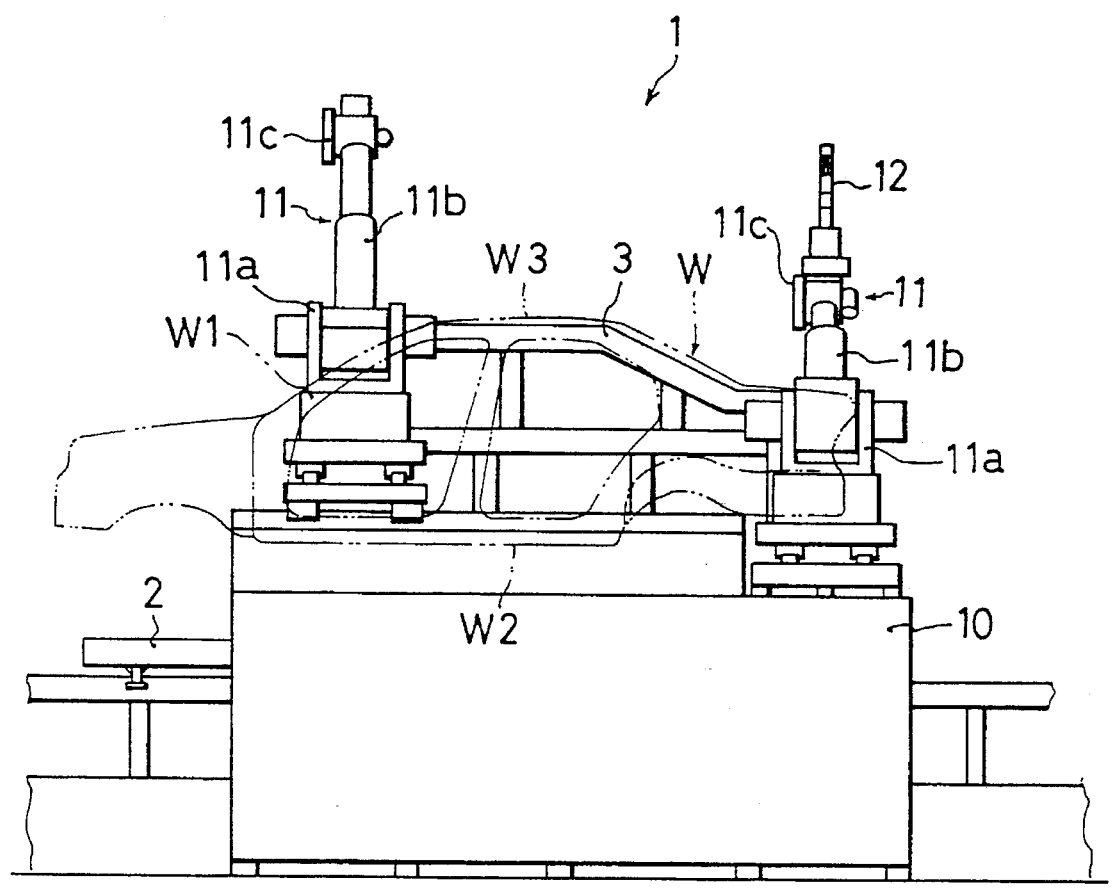
FIG. 1 is a side view of one example of an apparatus according to the present invention.
Figure 2:
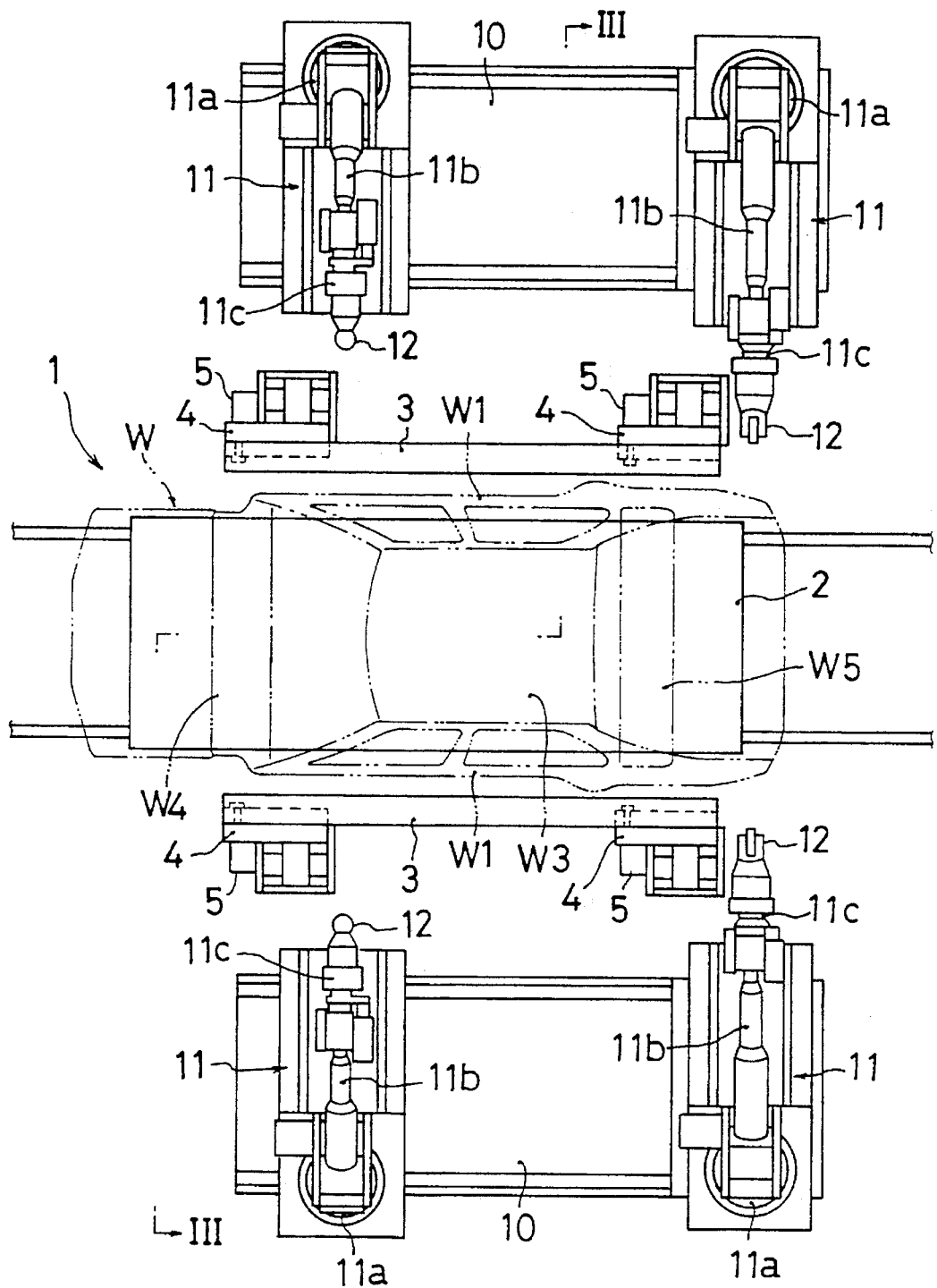
FIG. 2 is a plan view thereof.
Figure 3:
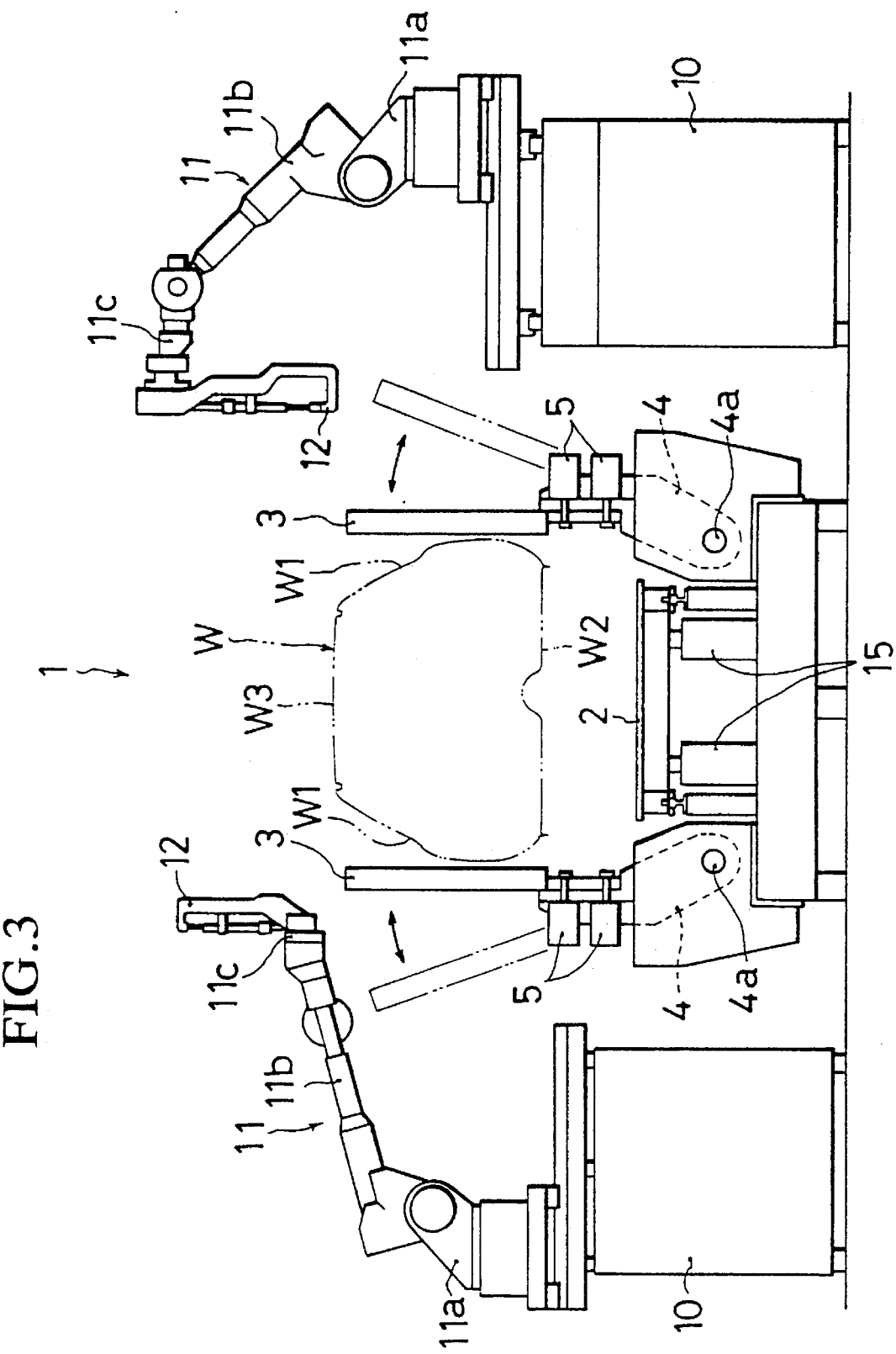
FIG. 3 is a front view as seen from the line III—III in FIG. 2.

Referring to FIGS. 1 through 3, numeral 1 denotes an assembly station. Motor vehicle body constituent parts in the form of right and left side panels W1, a floor panel W2, a roof panel W3, a dashboard upper piece W4 and a rear tray piece W5 are transported into the assembly station 1 in a condition in which they are temporarily assembled on a setting cart 2. These motor vehicle body constituent parts are welded (i.e., tack welded) together at a plurality of tack-welding portions, thereby assembling a motor vehicle body W. Though not illustrated, there are provided on the setting cart 2 workpiece receiving members and clamping members for holding the motor vehicle body constituent parts in a predetermined positional relationship.

In the assembly station 1 there are provided welding jigs 3 on both sides thereof. Each welding jig 3 is detachably mounted by clamp units 5 on a supporting member 4 which can be tilted or inclined by a driving mechanism, to be hereinafter described, about a pivot or a shaft 4a which functions as a fulcrum. It is thus so arranged that each welding jig 3 can be tilted towards an inward working position and an outward waiting or clearing position by the movement of the supporting member 4.

Figure 4:
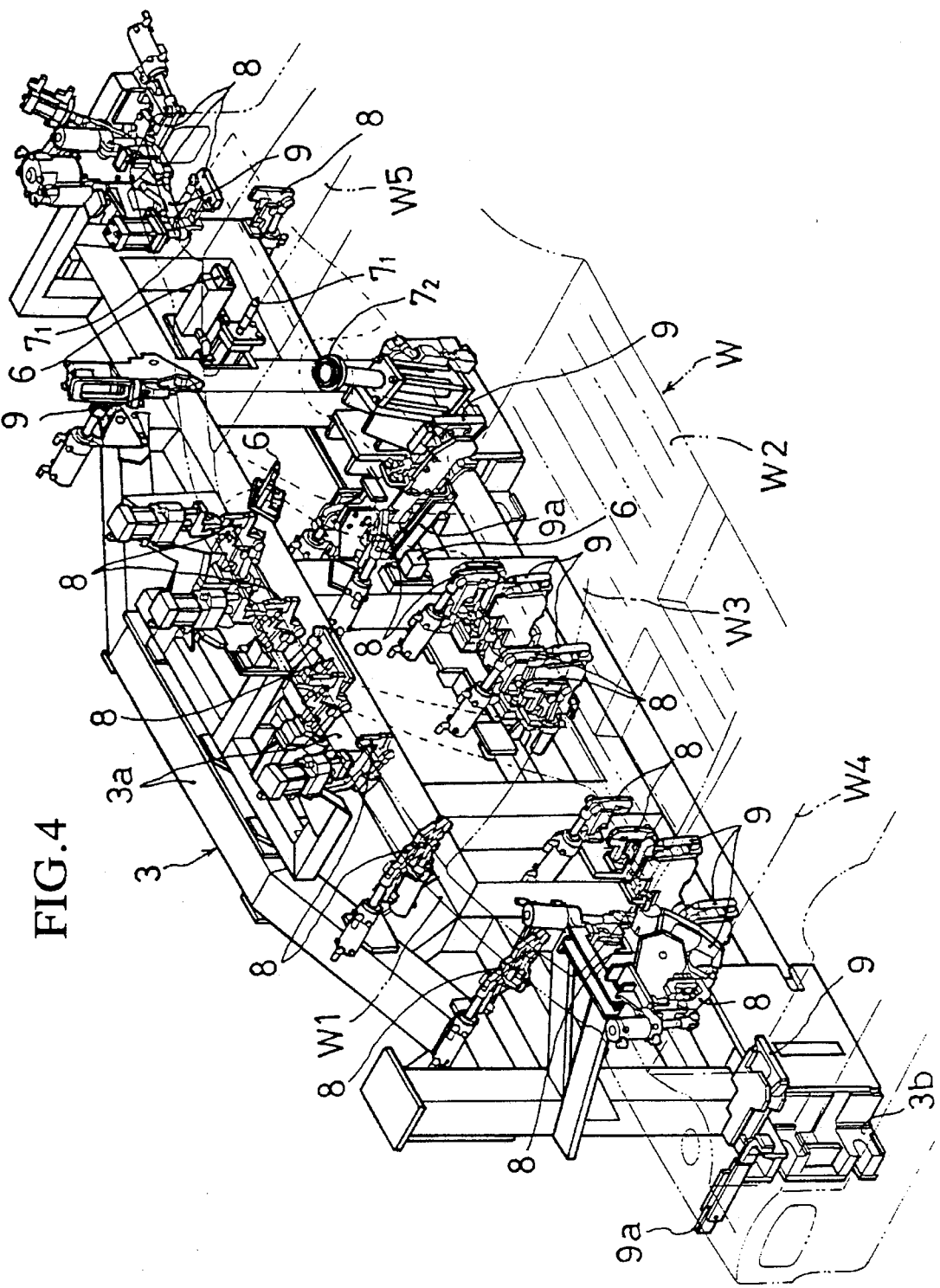
FIG. 4 is a perspective view of a welding jig.
Figure 5:
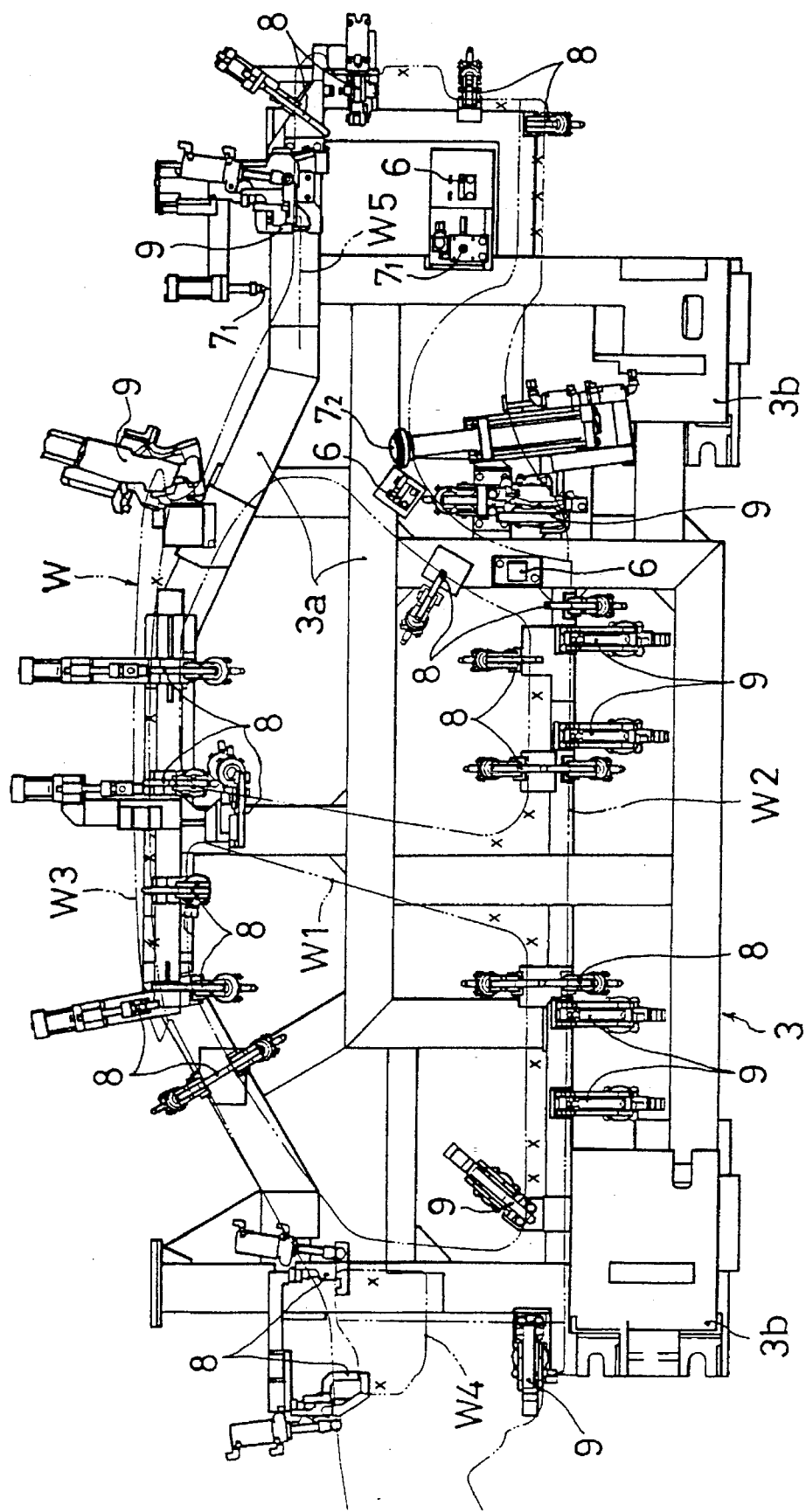
FIG. 5 is a side view of the welding jig as seen from an internal side thereof.

As shown in FIGS. 4 and 5, each welding jig 3 is arranged to be supported on the supporting member 4, FIGS. 2 and 3, at mounting bases 3b, FIG. 5, on both bottom ends of a jig frame 3a which is formed into the shape of a lattice. On the jig frame 3a there are mounted positioning members made up of various kinds of workpiece receiving elements 6, positioning pins $7_1$, a supporting pin $7_2$ for a rear damper mounting portion and workpiece clamping elements 8, all of which are for positioning the motor vehicle body constituting parts relative to each other and holding them together. Also mounted on the jig frame 3a are first welding guns 9 for performing the welding of a part (i.e., some out of the whole) of the tack-welding portions of the side panels W1 to the floor panel W2, the roof panel W3, the dashboard upper piece W4 and the rear tray piece W5. The first welding guns 9 to perform the welding of a part of the tack-welding portions of the side panels W1 to the dashboard upper piece W4 are omitted in the Figure.

Figure 6:
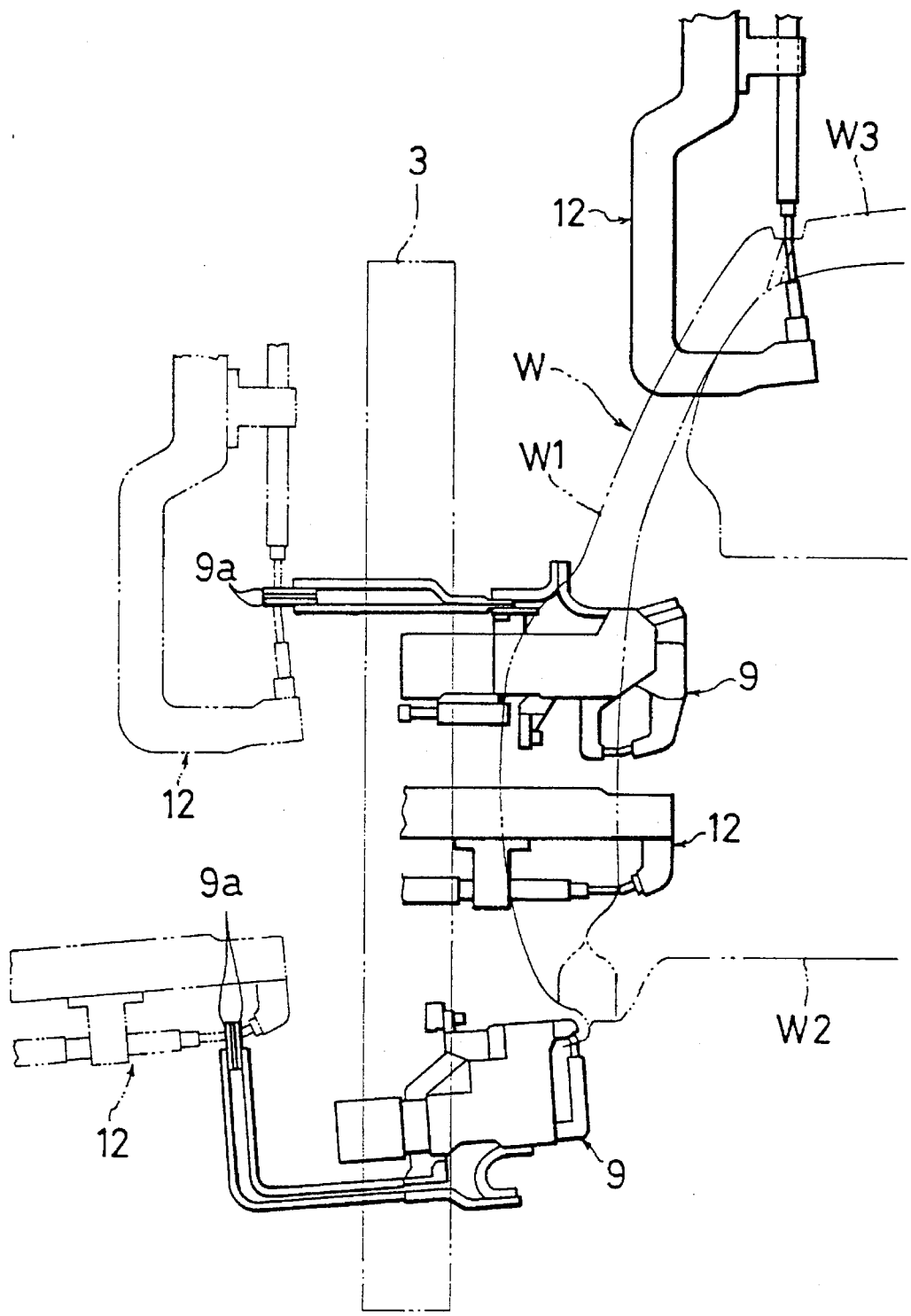
FIG. 6 is a view showing the relationship between first welding guns and second welding guns.

In the assembly station 1, FIGS. 1–3, there is provided a supporting base 10 on an outside of each welding jig 3. On each of the supporting bases 10 there are mounted two welding robots 11, i.e., a front one and a rear one. Each of these welding robots 11 is constituted by an articulated-type robot made up of a turnable robot main body 11a, a robot arm 11b which is swingably mounted on the robot main body 11a, and a C-shaped second welding gun 12 mounted on the front end of the robot arm 11b via a wrist portion 11c of a two-axis or three-axis construction. The welding robot 11 on the front side (left side in FIG. 1) is mounted on the supporting base 10 so as to be movable in the crossing two directions, i.e., in the back and forth direction and in the right and left direction. The welding robot 11 on the rear side is mounted on the supporting base 10 so as to be movable in the right and left direction. Each of the first welding guns 9 is constructed, as shown in FIG. 6, in an indirect power supply type provided with a feeder terminal 9a which extends outwards of the welding jig 3. It is thus so arranged that the electric power is supplied to each of the first welding guns 9 by pinching or holding in a pressurizing manner the feeder terminal 9a by a corresponding second welding gun 12.

Figure 7:
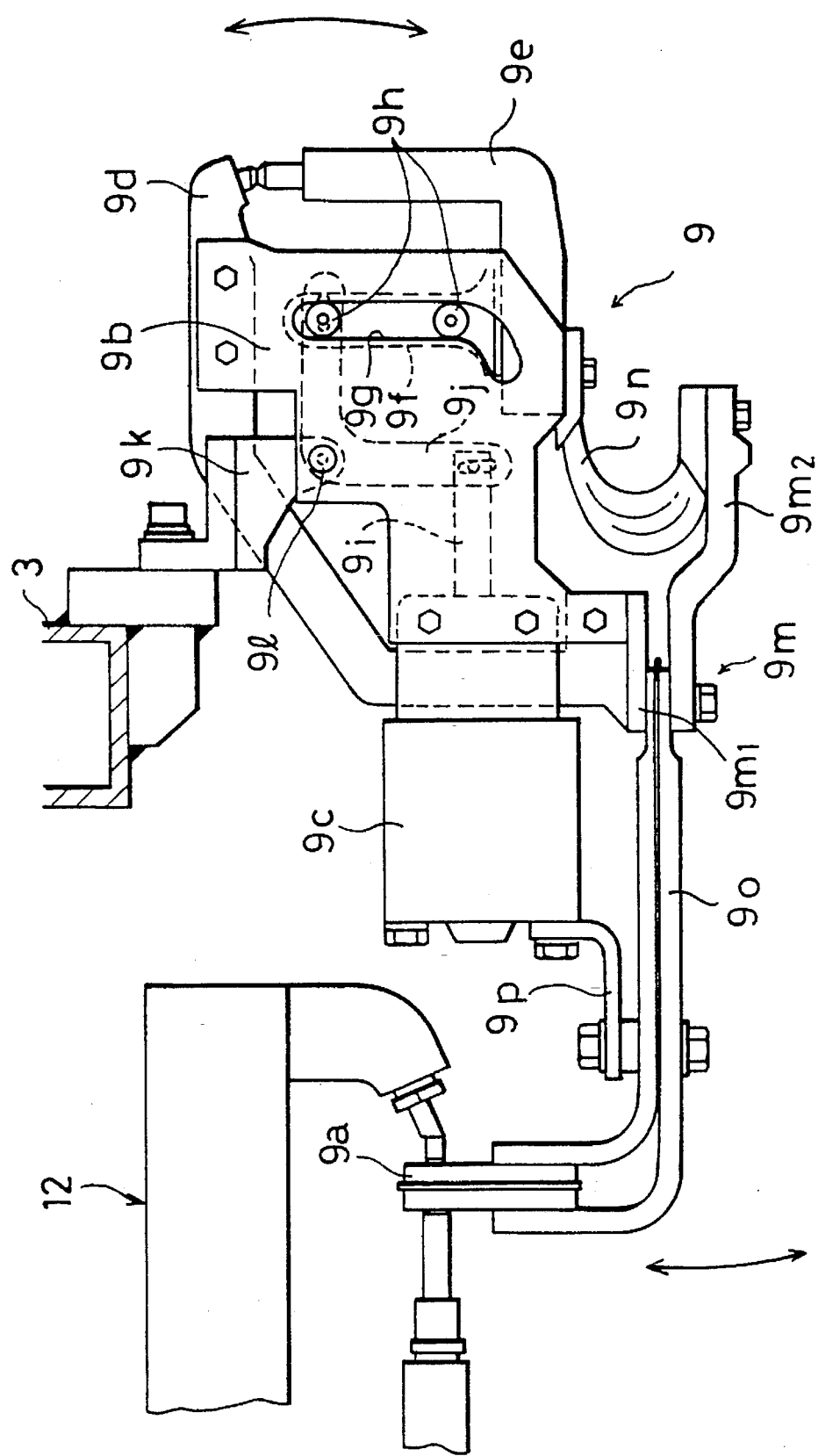
FIG. 7 is a front view of one example of the first welding gun.

Details of the first welding gun 9 given on the lower side in FIG. 6 are as shown in FIG. 7. The first welding gun 9 is provided with a gun bracket 9b having a pair of front and rear side plates, a pressurizing cylinder 9c which is attached to a rear end of the gun bracket 9b, a stationary gun arm 9d which is fixed to a front upper end of the gun bracket 9b, and a movable gun arm 9e which can be opened and closed in a vertical direction relative to the stationary gun arm 9d. On a rear end portion of the movable gun arm 9e there is mounted, via an electrically insulating material, an arm holder 9f which extends upwards. The arm holder 9f is slidably engaged, via a pair of engaging elements 9h, with a cam groove 9g which is formed in the gun bracket 9b. A lever 9j which interlocks with a piston rod 9i of the pressurizing cylinder 9c is connected to the arm holder 9f. It is thus so arranged that the movable gun arm 9e can be operated to open and close in the vertical direction by the guiding of the movable gun arm 9e along the guide groove 9g upon operation of the pressurizing cylinder 9c.

The gun bracket 9b is mounted on a support body 9k, which is provided to extend from the welding jig 3, so as to be swingable in the vertical direction via a pivot 9l. When a tack-welding portion is pinched between the movable gun arm 9e and the stationary gun arm 9d through the closing operation of the movable gun arm 9e, the tack-welding portion can be pinched between the two gun arms 9d, 9e without undue force through an equalizing operation by the swinging movement in the vertical direction of the gun bracket 9b, even if the tack-welding portion were to be vertically deviated or displaced.

At a lower rear end portion of the gun bracket 9b there is provided a receiving terminal (or an electric power receiving terminal) 9m made up of a pair of terminal plates $9m_1$, $9m_2$ which face each other. One $9m_1$ of the terminal plates is extended towards the stationary gun arm 9d and connected thereto and the other $9m_2$ of the terminal plates is connected to the movable gun arm 9e via a flexible electrically conductive member 9n such as an ounce metal plate or the like.

Here, one $9m_1$ of the terminal plates is fixed to the Gun bracket 9b, and the other $9m_2$ of the terminal plates is fastened or fixed to the one $9m_1$ terminal plate with an electrically conductive member 9o for power supply (or feeder conductive member 9o) being pinched between the two terminal plates $9m_1$, $9m_2$.

The feeder conductive member 9o is a rigid electrically conductive member which is made up of two copper plates, one being placed on top of the other, with an electrically insulating material therebetween. The feeder conductive member 9o is fastened or fixed to a stay 9p which is attached to a rear end of the pressurizing cylinder 9c in order to prevent the feeder conductive member 9o from vibrating. To the rear end of the feeder conductive member 9o there is fastened or fixed the above-described feeder terminal 9a which is made up of two terminal plates, one placed on top of the other, with an electrically insulating material therebetween. It is thus so arranged that the electric power can be supplied by the above-described second welding gun 12 by pinching the feeder terminal 9a.

Furthermore, in the present embodiment, the rear end of the feeder conductive member 9o is bent upwards to mount thereon the feeder terminal 9a. It is thus so arranged that the feeder terminal 9a can be pinched in a horizontal direction which is perpendicular to the direction of movement of the feeder terminal 9a due to the vertical movement of the gun bracket 9b through the equalizing operation.

In welding the tack-welding portions, the following procedure is followed. Namely, while the gun bracket 9b is first being equalized in position by closing the movable gun arm 9e, the tack-welding portion is pinched between the stationary gun arm 9d and the movable gun arm 9e. Electric power is then supplied to the first welding gun 9 by pinching the feeder terminal 9a by the second welding gun 12. The spot welding is thus performed by supplying electric power to the stationary gun arm 9d and the movable gun arm 9e through the tack-welding portion. In this case, an unbalanced load may sometimes be operated on the feeder terminal 9a in its pinching direction, i.e., in the horizontal direction. Even if this unbalanced load may be operated or applied, the movement of the gun bracket 3b in the direction of equalizing movement, i.e., in the vertical direction is prevented. Therefore, there will be applied no undue force to the tack-welding portion.

Figure 8:
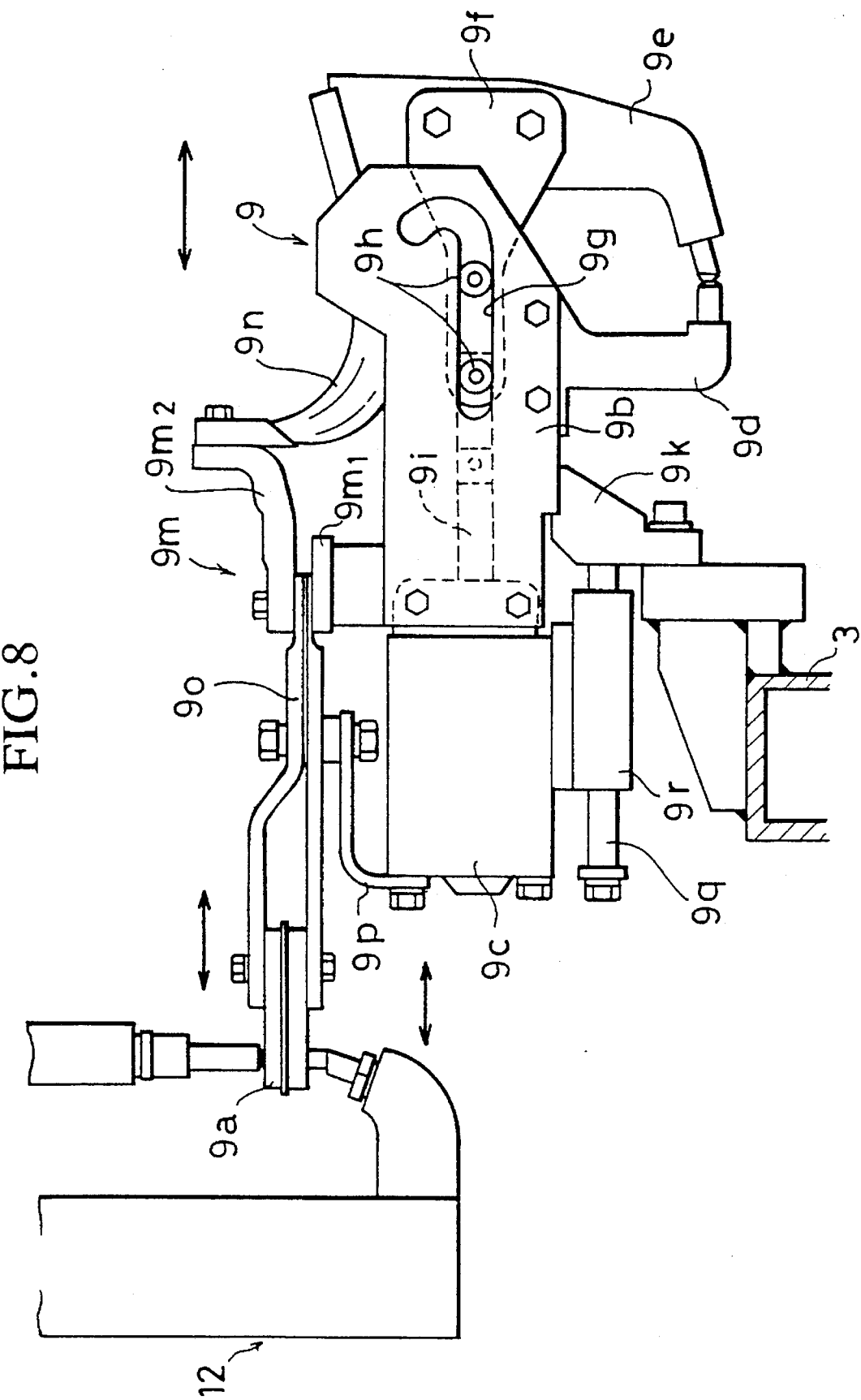
FIG. 8 is a front view of another example of the first welding gun.

Details of the first welding gun 9 given on the upper side in FIG. 6 are shown in FIG. 8. The same numerals are assigned to the parts or members that are equivalent to those of the above-described example. This first welding gun 9 is constructed such that a movable gun arm 9e is operated, by the operation of a pressurizing cylinder 9c, to open and close in the horizontal direction relative to a stationary gun arm 9d which is fixed to a gun bracket 9b. The gun bracket 9b is supported at a guide sleeve 9r, FIG. 8, which is located on an outside of the pressurizing cylinder 9c, such that the gun bracket 9b is horizontally slidable along a guide bar 9q fixed to a support body 9k which is fixed to the welding jig 3. It is thus so arranged that the horizontal positional deviation or displacement of the tack-welding portion can be absorbed by the equalizing operation in the form of a horizontal movement of the gun bracket 9b.

To a rear upper end of the gun bracket 9b there is fixed, as in the above-described embodiment, a receiving terminal 9m comprising a terminal plate $9m_1$ FIGS. 7 and 8, which is connected to the stationary gun arm 9d and a terminal plate $9m_2$ which is connected to the movable gun arm 9e via an electrically conductive elastic member 9n. To a rear end of an electrically conductive rigid member 9o, which is the same as the above-described embodiment, there is mounted a feeder terminal 9a in a manner that can be pinched in a vertical direction. It is thus so arranged that the gun bracket 9b does not move in the direction of the equalizing operation even if an unbalanced load is operated when the feeder terminal 9a is pinched by the second welding gun 12.

In the above-described both examples, the outwardly extending feeder terminal 9a is formed as a member separate from the electrically conductive member 9o. However, the feeder terminal 9a may also be formed integrally with the electrically conductive member 9o.

Details of the second welding gun 12 are as shown in FIG. 9. At a rear end of a C-shaped yoke 12a there is fixedly provided a pressurizing cylinder 12c via a holder 12b. A piston rod 12e, to be connected to a piston 12d inside the pressurizing cylinder 12c, is extended beyond the pressurizing cylinder 12c, and a pressurizing rod 12f is connected to a front end of the piston rod 12e. A yoke electrode 12g and a rod electrode 12h are mounted on the front end of the C-shaped yoke 12a and the front end of the pressurizing rod 12f, respectively, such that they face each other, thereby constituting the C-shaped welding gun.

The second welding gun 12 is supported, at a guide sleeve 12k which is located on an outer side of the pressurizing cylinder 12c, on a guide bar 12j which is on a gun bracket 12i to be mounted on a wrist portion 11c, FIGS. 2 and 3, of the robot 11, such that an equalizing operation can be made. A pair of output terminals of a transformer 12l, which is mounted on the gun bracket 12i, are connected to the C-shaped yoke 12a and the pressurizing rod 12f, respectively, via ounce metal plates 12m, FIG. 9. The output current of the transformer 12l can thus be able to flow through both the above-described electrodes 12g, 12h.

The pressurizing cylinder 12c is constructed by an eccentric cylinder which is made up by eccentrically connecting the piston rod 12e to the piston 12d. The pressurizing rod 12f is thus arranged to be prevented from rotating.

When the electrodes 12g, 12h of the second welding gun 12 have worn, they are reformed or dressed by abutting them against rotating cutter blades of an unillustrated electrode tip dresser. If the pressurizing rod 12f is supported only in the form of a cantilever by the pressurizing cylinder 12c, the pressurizing rod 12f is likely to be subjected to vibration at the time of dressing the electrode tips, with the result that the dressing accuracy of the electrode tips is likely to become poor. As a solution, in the present example, the following arrangement has been employed. Namely, there is fixed to the C-shaped yoke 12a a guide member 12n which slidably holds the pressurizing rod 12f by fitting it into the guide member 12n, and the pressurizing rod 12f is supported not only by the pressurizing cylinder 12c but also by the guide member 12n. According to this arrangement, the supporting rigidity of the pressurizing rod 12f can be increased and, accordingly, the vibrations of the pressurizing rod 12f at the time of electrode tip dressing can be restricted, thereby tip dressing the rod electrode 12h at a higher accuracy.

On the front side of the guide member 12n there is provided a cover plate 12o which protects the guide member 12n from welding sputters. Further, in order to prevent the short-circuiting between the C-shaped yoke 12a and the pressurizing rod 12f, the guide member 12n is fixed to the C-shaped yoke 12a via an electrically insulating material 12p.

In the above-described embodiment the pressurizing cylinder 12c is arranged to be an eccentric cylinder to prevent the pressurizing cylinder 12c from rotating. However, the following arrangement may also be employed. Namely, as shown in FIG. 10A, the pressurizing rod 12f is formed into a non-circular cross section or, as shown in FIG. 10B, the pressurizing rod 12f is formed with an engaging groove 12r for engaging therewith a pin 12q which is provided in the guide member 12n. The pressurizing rod 12f is thus inserted into the guide member 12n in a nonrotatable manner, thereby preventing the pressurizing rod 12f from rotating.

Details of clamp units 5 for fixing the welding jig 3 to the supporting member 4 are shown in FIGS. 11A through 11D. Each clamp unit 5 is provided with a clamp bar 5a which can be engaged with a notched portion 3c formed in a mounting base 3b, a cylinder 5b as a driving source, and a cam mechanism which swings and moves back and forth the clamp bar 5a such that it can be engaged with and disengaged out of the notched portion 3c in interlocking with the cylinder 5b.

The cam mechanism is made up of a swing arm 5d which swings by the cylinder 5b about a pivot 5c which functions as a fulcrum, an eccentric boss 5e which is disposed on the arm 5d eccentrically relative to the pivot 5c and which rotatably supports the clamp bar 5a in a swingable manner, an abutment member 5f which interlocks with the cylinder 5b, and a cam 5g which swings the clamp bar 5a outwards via the abutment member 5f against a spring (not illustrated). When the cylinder 5b is operated to extend from a clamped condition shown in FIG. 11A, the clamp bar 5a advances by the rotation of the eccentric boss 5e via the swing arm 5d. As a result, a head portion of the clamp bar 5a is lifted off an external surface of the mounting base 3b as shown in FIG. 11B. Then, the abutment member 5f is tilted by the cam 5g to thereby swing outwards the clamp bar 5a, with the result that the clamp bar 5a is unclamped out of engagement with the notched portion 3c as shown in FIG. 11C. If the cylinder 5b is operated to contract from this condition, the clamp bar 5a returns to a condition as shown in FIG. 11A by the movements that are opposite to those described above and, consequently, the welding jig 3 is clamped to the supporting member 4.

Figure 12:
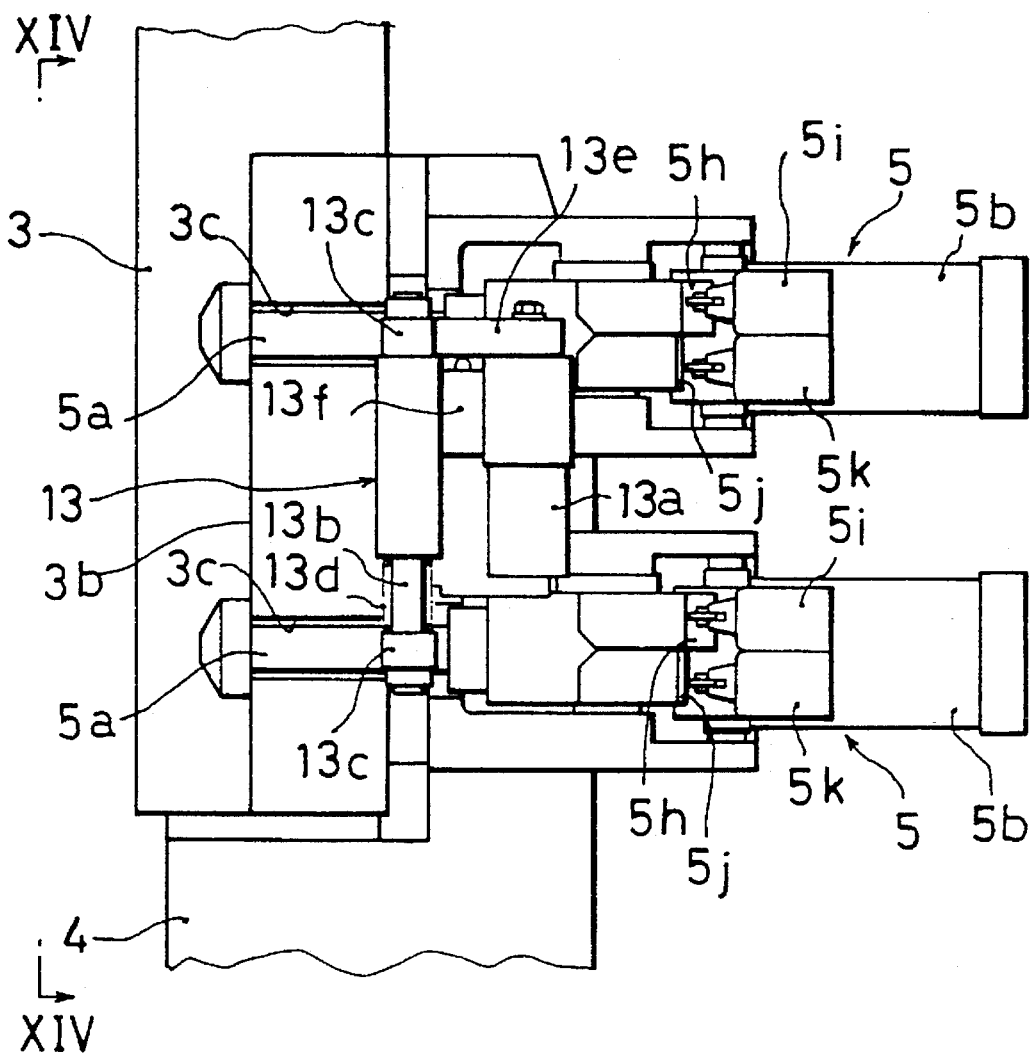
FIG. 12 is a front view of a portion in which the clamp unit is disposed.

In the clamp unit 5 there are provided a clamp switch 5i which detects, in cooperation with a dog 5h mounted on the clamp bar 5a, the returning of the clamp bar 5a to the clamped position, and an unclamp switch 5k, FIG. 12, which detects, in cooperation with a dog 5j mounted on the clamp bar 5a, the swinging of the clamp bar 5a into the unclamped position.

The construction of the above-described clamp unit 5 is known from the Japanese Published Unexamined Utility Model Registration Application No. 17755/1980. In the art as disclosed therein, there is the following disadvantage. Namely, in case where there is a clearance between the welding jig 3 and the supporting member 4 or in case where there is a manufacturing error in the mounting base 3b of the welding jig 3, the head portion of the clamp bar 5a may interfere with the corner or the like of the mounting base 3b in the course of movement of the clamp bar 5a from the unclamped position to the clamped position. As a result, the clamp bar 5a will be retracted towards the supporting member 4, as shown in FIG. 11D, through the rotation of the eccentric boss 5e even when the clamp bar 5a has not returned to the clamped position. The welding jig 3 cannot therefore be properly clamped any more.

At this time, if the clamp switch 5i is not switched on, it is possible to detect the abnormality in clamping. However, there are sometimes cases where the clamp switch 5i is switched on even if there does exist an abnormality in clamping. As a result, the work is continued while the clamping is abnormal, and this will be accompanied by an emergency in the form of dropping of the welding jig 3 out of position.

Figure 13:
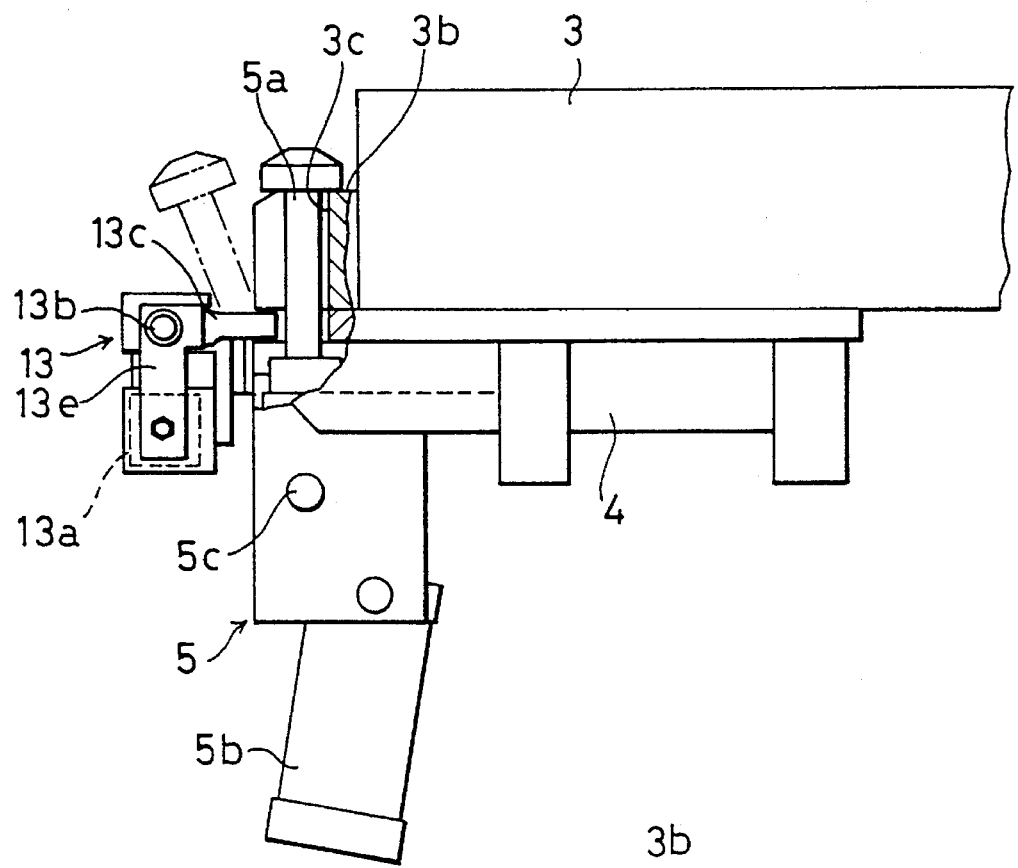
FIG. 13 is a plan view thereof.
Figure 14:
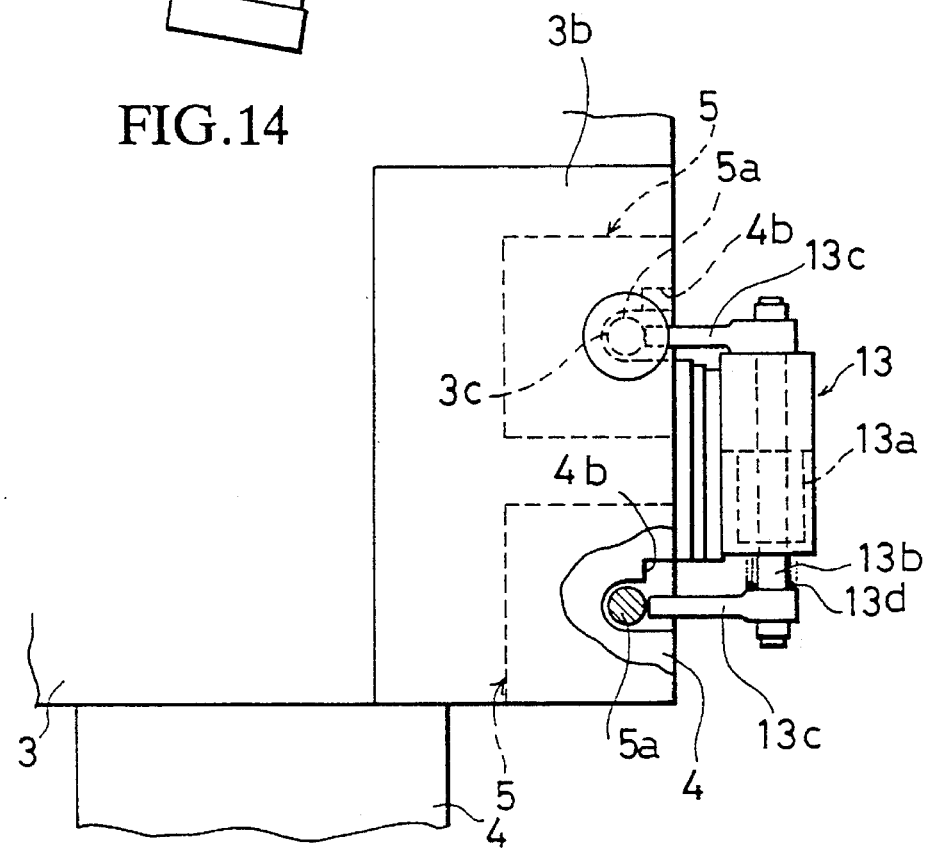
FIG. 14 is a side view as seen from the line XIV—XIV in FIG. 12.

As a solution, in the present embodiment, there is provided a lock unit 13, as shown in FIGS. 12 through 14, outside the position where the clamp unit 5 is disposed. FIGS. 12 through 14 show the portion where the mounting base 3b on the lower left side of FIG. 5 is clamped. The clamp unit 5 is provided in a pair of upper and lower ones to correspond to a pair of upper and lower notched portions 3c which are formed in the mounting base 3b.

The lock unit 13 is provided with a movable rod 13b to be moved back and forth in a direction perpendicular to the locus of swing of the clamp bar 5a, i.e., in a vertical direction by a cylinder 13a which is provided in the lock unit 13. On both upper and lower ends of the movable rod 13b there are attached a pair of lock pieces 13c, 13c which are respectively engageable with the pair of upper and lower clamp bars 5a, 5a. Within a pair of upper and lower guide grooves 4b which are formed in the supporting member 4, both the lock pieces 13c, 13c are arranged to be movable between the locked position which corresponds to the locus of swinging of each clamp bar 5a and the unlocked position thereabove. A spring 13d to bias or urge the movable rod 13b downwards is inserted on an outside of the movable rod 13b so that both the lock pieces 13c, 13c can be urgingly held in the locked position.

Though the cylinder 13a may be disposed coaxially with the movable rod 13b, the following arrangement has been employed in the present example. Namely, the cylinder 13a is disposed in an offset manner relative to the movable rod 13b and the movable rod 13b is connected to the cylinder 13a via a connecting portion 13e which is integral with the upper lock piece 13c.

The lock unit 13 is provided, in a space between the cylinder 13a and the movable rod 13b, with a limit switch 13f which lies opposite to or faces the connecting portion 13e. It is thus so arranged that the limit switch 13f can be switched on when the lock piece 13c is moved to the locked position.

When the clamp units 5 are to be unclamped, the lock pieces 13c are moved in advance to the unlocked position. The lock pieces 13c are moved to the locked position after the clamp units 5 have been clamped. In this case, at the time of clamping operation, should there occur such an abnormal clamping as shown in FIG. 11D in which the clamp bar 5a will not return to the normal clamped position due, for example, to an interference of the head portion of the clamp bar 5a with a corner portion of the welding jig 3, the lock pieces 13c come into abutment with the clamp bars 5a on their way back to the locking position. If the abnormal clamping is small in degree, the clamp bars 5a will be pushed or forced into the normal clamped position by a wedge function due to the moving force of the lock pieces 13c, whereby the abnormal clamping will disappear. When the clamp bars 5a are not pushed into the clamped position and the abnormal clamping is not corrected or does not disappear, the lock pieces 13c will no longer move down to the locked position. Consequently, the limit switch 13f will remain switched off. In this manner, the occurrence of abnormality in clamping can surely be detected by the signal of the limit switch 13f and the reliability of the clamp unit 5 can be improved.

Figure 15:
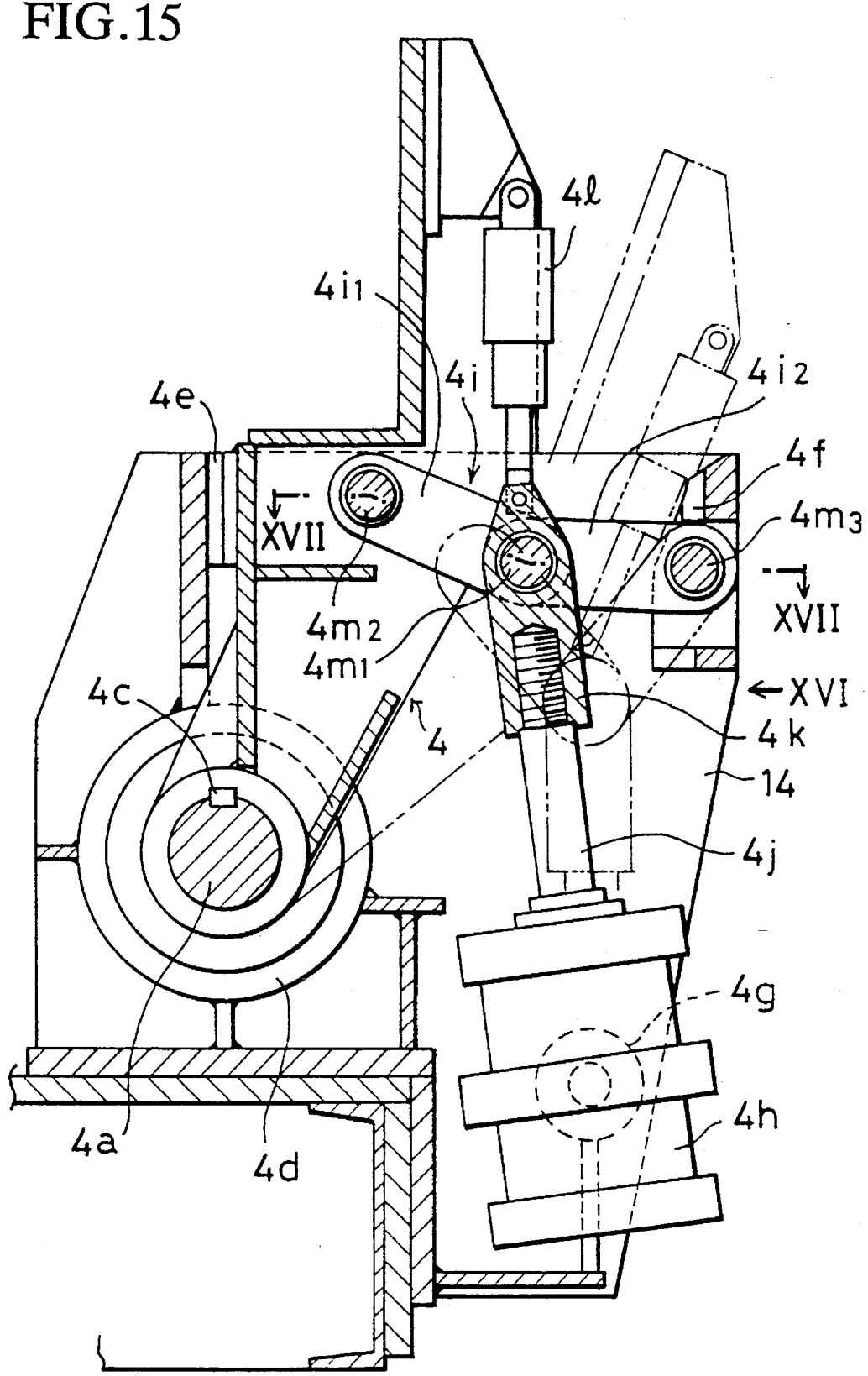
FIG. 15 is a cross-sectional front view of the portion of a driving mechanism for a supporting member.
Figure 16:
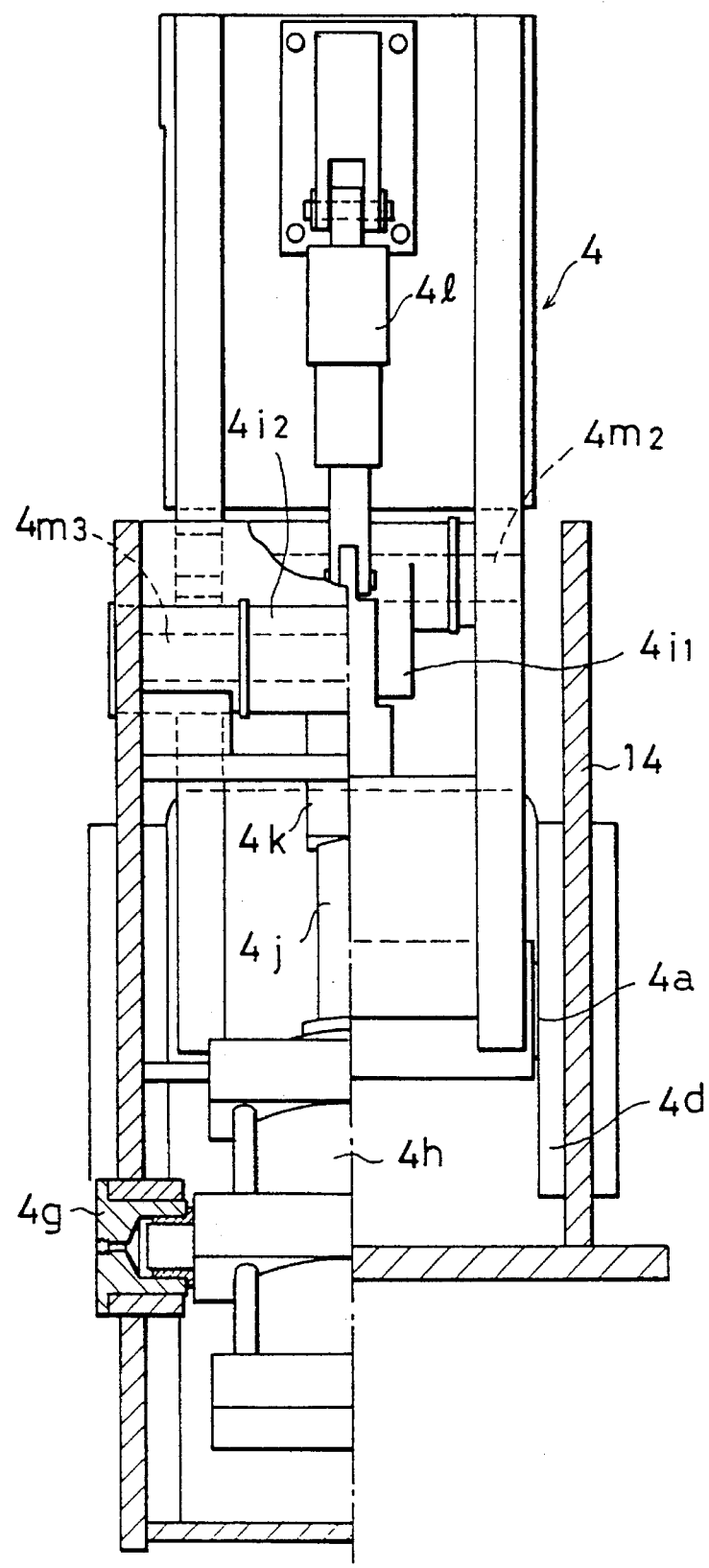
FIG. 16 is a half sectional view as seen in the direction of an arrow XVI in FIG. 15.
Figure 17:
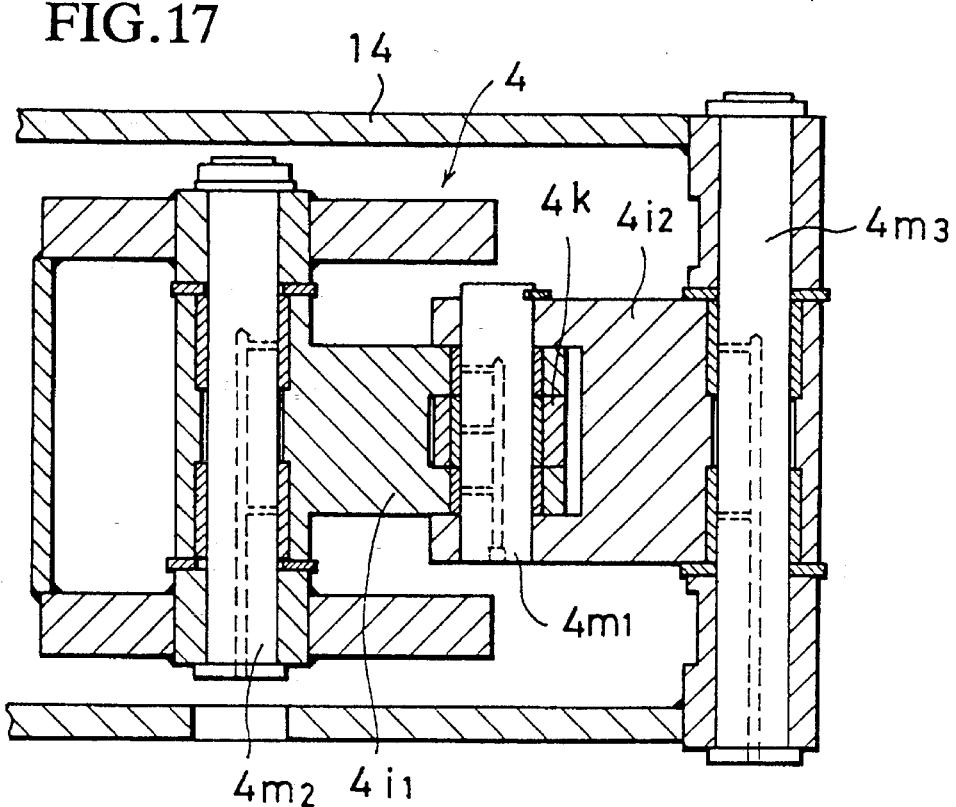
FIG. 17 is a sectional plan view taken along the line XVII—XVII in FIG. 15.

Details of a driving mechanism to tilt the supporting member 4 are shown in FIGS. 15 through 17. The supporting member 4 is provided at its lower end with a pivot or shaft 4a whose free relative rotation is prevented by a key 4c. This pivot 4a is rotatably supported via a bearing 4d on an apparatus bed 14 which is provided on a side of the assembly station 1. The supporting member 4 is arranged to be swingable about the pivot 4a between an inner tilting end point and an outer tilting end point to be respectively defined by a pair of stoppers 4e, 4f which are provided on the apparatus bed 14.

The driving mechanism for tilting is made up of a driving cylinder 4h which is swingably mounted on the apparatus bed 14 via a bearing 4g, and a link mechanism 4i which is provided so as to bridge the supporting member 4 and the apparatus base 14. A connecting piece 4k which is attached to an upper end of a piston rod 4j of the driving cylinder 4h is connected to the link mechanism 4i so that the supporting member 4 can be tilted by the driving cylinder 4h via the link mechanism 4i.

There is also provided a cylinder-type damper member 4l which gives a damper or buffer function at the time of contraction. The upper end and the lower end of the damper member 4l are respectively connected to the supporting member 4 and the link mechanism 4i. It is thus so arranged that the damper member 4l is contracted at both the inner tilting end point and the outer tilting end point through the operation of the link mechanism 4i. The shocks to occur at the time when the supporting member 4 abuts the respective stoppers 4e, 4f can thus be alleviated by the single damper member 4l.

In more detail, the link mechanism 4i in the present example is made up of a pair of first and second links $4i_1$, $4i_2$ which are pivotally connected at each one end thereof to the connecting piece 4k via a common pivot $4m_1$. The other end of the first link $4i_1$ is pivotally connected to the supporting member 4 via a pivot $4m_2$, and the other end of the second link $4i_2$ is pivotally connected to the apparatus bed 14 via a pivot $4m_3$. Further, the lower end of the damper member 4l is pivotally connected to the connecting piece 4k.

Figure 18:
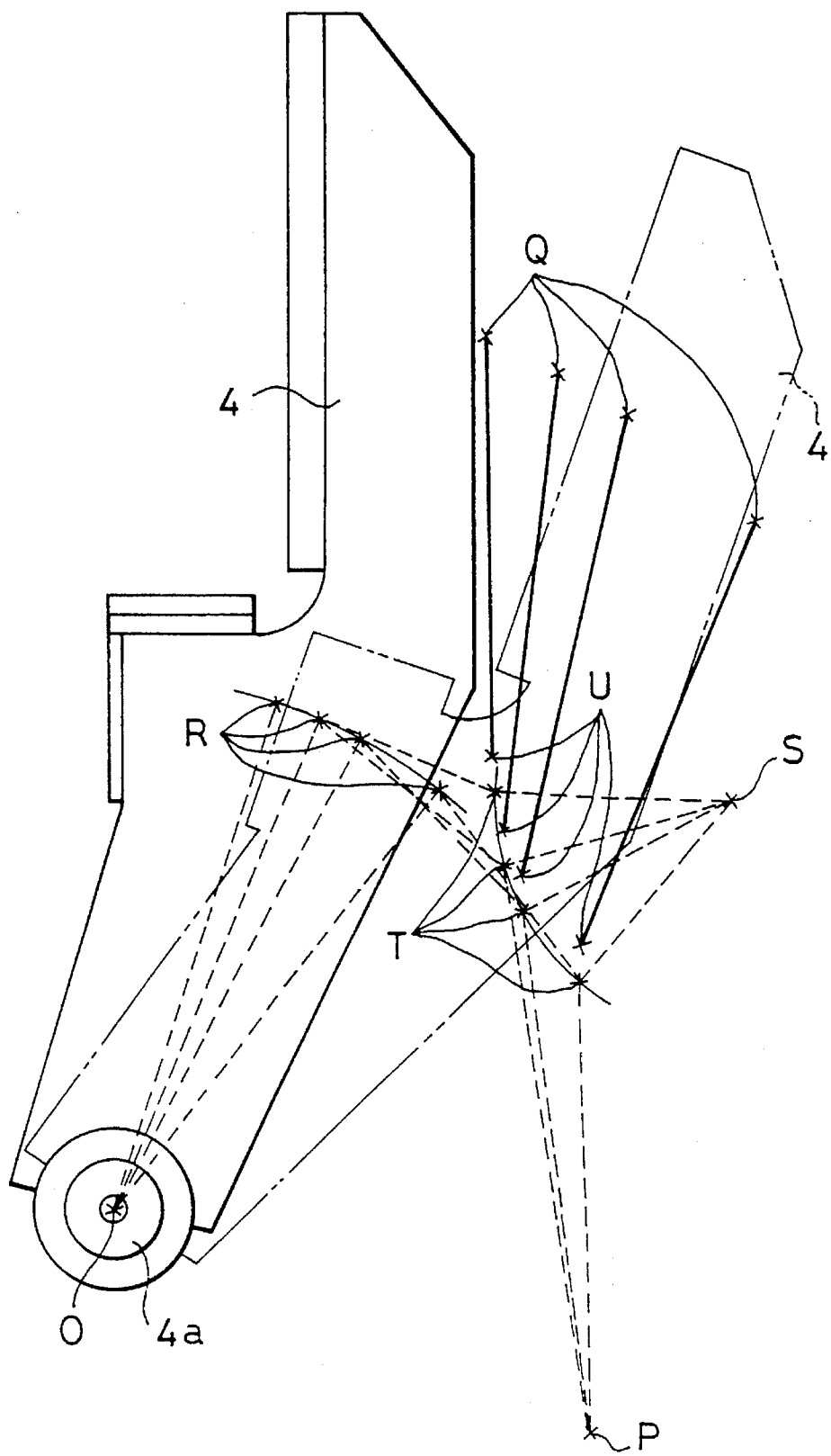
FIG. 18 is a diagram showing the loci of movements of a link mechanism and a damper member.

When the supporting member 4 is tilted, the link mechanism 4i and the damper member 4l move as shown in FIG. 18. In this Figure, alphabet O represents the tilting center of the supporting member 4, P represents the swinging center of the driving cylinder 4h, Q represents the pivoting center of the upper end of the damper member 4l, R represents the pivoting center of the above-described other end of the first link $4i_1$, S represents the pivoting center of the above-described other end of the second link $4i_2$, T represents the pivoting center of the above-described one end of both the links $4i_1$, $4i_2$, and U represents the pivoting center of the lower end of the damper member 4l.

Figure 19:
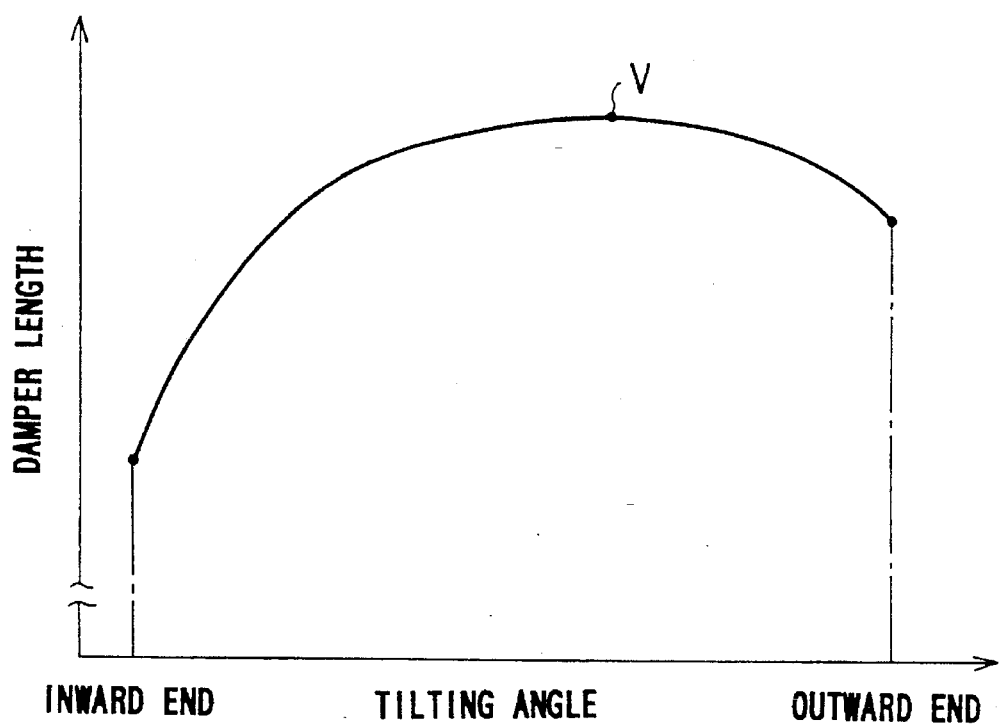
FIG. 19 is a graph showing the change in the length of the damper member.

As can be seen from this Figure, when the driving cylinder 4h is extended (to be extended along the length between P–T), the supporting member 4 is tilted inwards. When the driving cylinder 4h is contracted (to be contracted along the length between P–T), the supporting member 4 is tilted outwards. In accordance with the tilting of the supporting member 4, the length of the damper member 4l (the length between Q–U) varies as shown in FIG. 19. A maximum point V on the curve, FIG. 19, to show the change in length of the damper member 4l appears in a point between the inward tilting end point and the outward tilting end point. It follows that the damper member 4l is contracted at either of the inward tilting end point and the outward tilting end point. The tilting speed of the supporting member 4 is thus reduced due to the buffer function or effect of the damper member 4l in the neighborhood of each of the tilting terminal points. As a result, the shocks at the time of abutment of the supporting member 4 against each of the stoppers 4e, 4f can be alleviated.

In the above example, the damper member 4l is connected to the connecting piece 4k which connects the piston rod 4j of the driving cylinder 4h and the link mechanism 4i. However, it is also possible to directly connect the damper member 4l to the links which constitute the link mechanism 4i. Anyway, what is required is to make an arrangement such that the maximum point in the curve of change in the damper length appears in a point between the inward tilting end point and the outward tilting end point.

When the motor vehicle body W is assembled by using the assembly apparatus as constructed above, the following steps are followed. Namely, the setting cart 2 which has been conveyed into the assembly station 1 is lifted by lifters 15, FIG. 3, which are disposed in the assembly station 1. Then, the welding jigs 3 are swung into the working position and the motor vehicle body constituent parts on the setting cart 2 are held by fixing the relative positional relationship among each other by means of the positioning members which are mounted on the welding jig 3 and are made up of the workpiece receiving elements 6, the positioning pins $7_1$, the supporting pin $7_2$ for the rear damper mounting portion, and the workpiece clamping elements 8, FIG. 5. After thus handing over the motor vehicle body constituent parts from the setting cart 2 to the welding jigs 3, the setting cart 2 is lowered and is returned to the setting station in the preceding stage. The motor vehicle body constituent parts to be assembled next are set in position on the returned setting cart 2.

In the assembly station 1, on the other hand, all the first welding guns 9 are closed to pinch the relevant tack-welding portions to be handled by each, and the feeder terminals 9a of the first welding guns 1 are pinched by the respective second welding guns 12 as shown by imaginary lines in FIG. 6 to supply the electric power, thereby welding each of the tack-welding portions.

Then, the second welding guns 12 are moved towards the motor vehicle body W, as shown by thick lines in FIG. 6, by passing them outside the welding jigs 3 or through the framed space of the jig frames 3a. The remaining tack-welding portions (as marked by "x" in FIG. 5) that are not handled by the first welding guns 9 are then sequentially welded. In such a case, because the tack-welding portions to be handled by the second welding guns 12 cannot all be pinched at the same time, there is a possibility that positions of parts at subsequent tack-welding portions may give rise to deviation or displacement while welding the tack-welding portions that lie ahead in the welding sequence. However, as described above, since main tack-welding portions have already been welded in advance by the first welding guns 9, the parts are prevented from deviating or displacing in position. The motor vehicle body W can thus be assembled at a higher accuracy.

While the tack-welding portions are welded by the second welding guns 12, the first welding guns 9 may be opened or freed from pinching. However, in order to further improve the function of preventing the positional deviation of the parts, it is preferable to open the first welding guns 9 after the welding of the tack-welding portions by the second welding guns 12 has been finished. Further, by following this procedure, the tack-welding portions have already been cooled and solidified enough by the time when the first welding guns 9 are opened. It is therefore possible to prevent the occurrence of poor welding in the form of so-called "pick up", i.e., a phenomenon in which unsolidified metal is stretched like a thread at the time of opening the welding guns and is solidified in that condition.

After the welding of the tack-welding portions by the second welding guns 12 has been finished, the assembled motor vehicle body W is discharged by an unillustrated discharging cart out of the assembly station 1 into a reinforcing-welding station. On the other hand, the setting cart 2 is sent from the setting station to the assembly station 1 to hand over the next motor vehicle body constituent parts to the welding jigs 3. The above-described steps are repeated to thereby continuously assemble the motor vehicle bodies W.

When the kind of the motor vehicle is changed, the clamp units 5 are unclamped to change the welding jigs 3. In this case, since the welding jigs 3 need not be provided with welding transformers for the first welding guns 9 and since not all the tack-welding portions are welded by the first welding guns 9, the number of the first welding guns 9 to be mounted on the welding jigs 3 can be made smaller. The welding jigs 3 can therefore be made smaller in size and lighter in weight, with the result that the replacement work can be made easier and the equipment cost can be reduced.

In the above descriptions, members and/or parts referred to in a singular form may, where necessary, be understood to represent plural forms too, and vice versa due solely to the linguistic matters, i.e., the expression in the English language.

It is readily apparent that the above-described apparatus and method of assembling a motor vehicle body meet all of the objects mentioned above and also have the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. In a method of assembling a motor vehicle body by fixing a relative positional relationship among a plurality of motor vehicle body constituent parts by means of positioning members provided in a welding jig which is disposed on each side of an assembly station and, in this condition, welding together the plurality of motor vehicle body constituent parts at a plurality of tack-welding locations, the improvement comprising:
mounting on said welding jig first welding guns of indirect feeding type for welding at least some of said plurality of tack-welding locations on said body constituent parts;
disposing at least one welding robot at a position outside said welding jig disposed on each side of said assembly station, said welding robot having mounted thereon a second welding gun;
tack-welding said body constituent parts at said locations to be tack-welded by supplying electric power from said second welding gun to said first welding guns by pinching, by said second welding gun, a feeder terminal on each of said first welding guns, said electric power being supplied to said first welding guns in a condition in which said at least some of said plurality of tack-welding locations are being pinched by said first welding guns; and
thereafter welding a remaining number of said plurality of tack-welding locations by said second welding gun.

2. In an apparatus for assembling a motor vehicle body by fixing relative positional relationship among a plurality of motor vehicle body constituent parts by means of positioning members provided in a welding jig which is disposed on each side of an assembly station and, in this condition, welding together the plurality of motor vehicle body constituent parts at a plurality of tack-welding locations, the improvement comprising:
first welding guns of indirect feeding type mounted on said welding jig, said first welding guns being for welding at least some of said plurality of tack-welding locations;
a welding robot disposed at a position outside said welding jig in said assembly station; and a second welding gun mounted on said welding robot for supplying electric power to said first welding gun by pinching a feeder terminal of each of said first welding guns and for welding a remaining number of said plurality of tack-welding locations.

3. An apparatus for assembling a motor vehicle body according to claim 2, further comprising a receiving terminal which is provided in stationary relationship with a gun bracket of each of said first welding guns mounted on said welding jig; and an electrically conductive rigid member, one end thereof being connected to said receiving terminal and the other end thereof being provided with said feeder terminal.

4. An apparatus for assembling a motor vehicle body according to claim 3, wherein said gun bracket of each of said first welding guns is mounted on said welding jig for equalizing operation of said first welding gun, and said feeder terminal of each of said first welding guns is disposed so as to be pinched in a direction perpendicular to the direction of movement of said feeder terminal for equalizing operation of said gun bracket.

5. An apparatus for assembling a motor vehicle body according to claim 2, wherein said second welding gun is a C-shaped welding gun comprising: a C-shaped yoke; a pressurizing cylinder fixed to a rear end of said C-shaped yoke; a pressurizing rod moved forwards and backwards by said pressurizing cylinder; a yoke electrode mounted on a front end of said C-shaped yoke; and a rod electrode positioned opposite said yoke electrode, wherein said C-shaped yoke is provided with a guide member for slidably inserting said pressurizing rod through said guide member.

6. An apparatus for assembling a motor vehicle body according to claim 2, further comprising:

a supporting member for mounting thereon said welding jig;

a clamp unit provided on said supporting member, said clamp unit comprising a clamp bar engageable with a notched portion formed in said welding jig, a driving source, a cam mechanism which swings and moves said clamp bar forwards and backwards into and out of engagement with said notched portion in interlocking relationship with said driving source, whereby said welding jig is detachably supported by said supporting member;

a lock unit which has a cylinder and is mounted on said supporting member;

a movable rod in said lock unit and movable back and forth in a direction perpendicular to said clamp bar in interlocking relationship with said cylinder; and a lock piece on said movable rod for locking said clamp bar, as a result of engagement with said clamp bar, in a clamped position in which said clamp bar is engaged with said notched portion.

7. An apparatus for assembling a motor vehicle body according to claim 6, further comprising a detecting means in said lock unit for detecting movement of said lock piece into a position coinciding with the locus of swing of said clamp bar.

8. An apparatus for assembling a motor vehicle body according to claim 2, further comprising:

a supporting member for mounting thereon said welding jig, said supporting member being pivotally supported by an apparatus bed disposed on each side of said assembly station;

a driving cylinder for tilting said supporting member;

a pair of stoppers defining positions of tilting end points of said supporting member in opposite directions;

a link mechanism bridging said supporting member and said apparatus bed, wherein a piston rod of said driving cylinder is connected to said link mechanism such that said supporting member can be tilted by said driving cylinder via said link mechanism; and a damper member for absorbing shocks, one end of which is connected to said link mechanism and the other end of which is connected to said supporting member, wherein said link mechanism is arranged such that a maximum point of a curve showing a change in length of said damper member, in accordance with tilting of said supporting member appears in a point between the tilting end point in one direction and the tilting end point in the opposite direction.

9. An apparatus for assembling a motor vehicle body according to claim 8, wherein said link mechanism comprises a pair of links, one end of each of which is pivotally connected to said piston rod via a common pivot, the other end of one of said links is pivotally connected to said supporting member, and the other end of the other of said links is pivotally connected to said apparatus bed.

* * * * *